C. M. SIEVER.
NUT LOCK.
APPLICATION FILED FEB. 11, 1913.
1,081,631.
Patented Dec. 16, 1913.
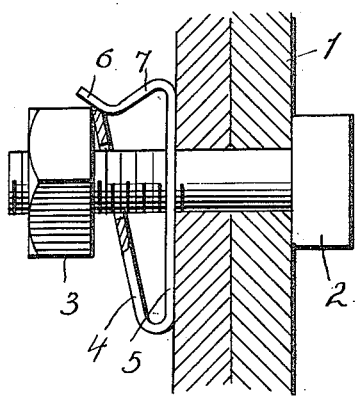
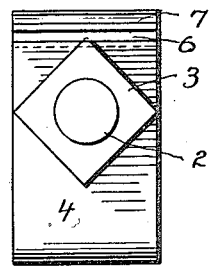
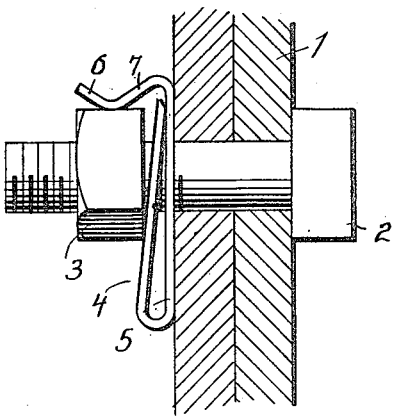
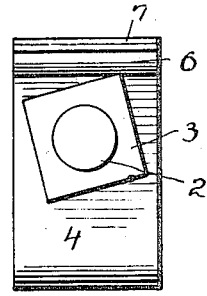
Witnesses
R. N. Jones
R. M. Smith
Inventor
Charles M. Siever.
By
Attorney

UNITED STATES PATENT OFFICE.

CHARLES M. SIEVER, OF HOLTON, KANSAS.

NUT-LOCK.

1,081,631.

Specification of Letters Patent.   Patented Dec. 16, 1913.

Application filed February 11, 1913.   Serial No. 747,746.

*To all whom it may concern:*

Be it known that I, CHARLES M. SIEVER, a citizen of the United States, residing at Holton, in the county of Jackson and State of Kansas, have invented certain new and useful Improvements in Nut-Locks; and I do hereby declare the following to be a full, clear, and exact description of the invention, such as will enable others skilled in the art to which it appertains to make and use the same.

This invention relates to nut locks and has for its primary object the provision of a simple and efficient device for securely locking a nut on a bolt.

Another object of the invention resides in the provision of a nut lock formed of a continuous strip of flat metal bent intermediate its ends to provide spring legs, said legs being apertured to permit the passage of the bolt and one of said legs being formed upon its free end with a nut engaging lip.

The invention also aims to generally improve devices of this nature, to render them more reliable, cheaper to manufacture, and more commercially desirable.

With these and other objects in view, as will become more apparent as the description proceeds, the invention consists in certain novel features of construction, combination, and arrangement of parts, as will be hereinafter described and claimed.

For a complete understanding of my invention, reference is to be had to the following description and accompanying drawings, in which, Figure 1 is a longitudinal sectional view through my nut lock, showing the same applied to a bolt and in inoperative position.
Fig. 2 is a view taken on the plane at right angles to Fig. 1, the nut lock being shown in elevation, Fig. 3 is an edge elevation, showing the nut lock in operative position, and, Fig. 4 is a front view taken on a plane at right angles to Fig. 3.

Referring in detail to the drawings by numerals, 1 designates a base of any construction, 2 a bolt passing therethrough, and 3 a nut threaded upon the end of said bolt.
My improved nut lock is formed of a continuous strip of flat spring metal bent intermediate its ends to form legs 4 and 5, each of which is apertured to permit the passage therethrough of the bolt 2. The inner leg 5 has a nut engaging lip or projection extending laterally from its free end toward the leg 4, said lip having the oppositely inclined sections 6 and 7. When the nut lock is in its inoperative position, the leg 4 is in engagement with the section 6 of the lip and the inner edge of said section projects below the free end of said leg. As the nut is tightened upon the bolt the leg 4 is forced toward the leg 5 and raises the nut engaging lip. When said nut has been screwed sufficiently far upon the bolt, the leg 4 will snap under the section 7 of the lip, permitting said lip to spring into engagement with the nut, thereby locking the latter.

It will be noted that the free end of the leg 4 is beveled slightly for better engagement with the nut engaging lip. The openings through the legs are so positioned as to permit the nut being freely turned until the leg 4 is sprung into engagement with the leg 5, as shown in Fig. 3.

Any one of the various well known means may be employed for preventing a rotational movement of the nut lock relative to the bolt.

From the foregoing description taken in connection with the accompanying drawings, it will be seen that I have provided an extremely simple and efficient nut lock, which is adapted for use in locking nuts of every description.

It is to be understood that while I have shown and described the preferred embodiment of my invention, I do not wish to be limited to this exact construction, combination, and arrangement of parts, but may make such changes as will fall within the spirit and scope of the invention as defined by the appended claims.

Having thus described my invention, what I claim is:—

1. The combination with a bolt and nut, of a locking plate bent upon itself so as to form legs, said legs being provided with alining openings to receive the shank of said bolt, and a nut engaging lip formed upon one of said legs, said lip being adapted for engagement with the free edge of the other leg.

2. The combination with a bolt and nut, of a spring locking plate bent upon itself to form legs, said legs being provided with alining openings to receive the shank of the bolt, and a spring nut engaging lip formed upon the free end of one of said legs and projecting toward the other of said legs, the lip being provided with oppositely inclined sections, one of said sections being adapted for engagement with that leg which is opposed to the nut, whereby the lip will be forced outwardly as the nut is tightened, said last mentioned leg being adapted to move from engagement with the last mentioned lip section, whereby said lip may spring into engagement with the nut.

3. The combination with a bolt and nut, of a spring locking plate bent upon itself to form legs which are provided with alined openings to receive the shank of the bolt, and an inwardly curved nut engaging lip formed upon the free extremity of one of the legs, said lip being forced outwardly by an inward movement of the other leg, a further movement of said last mentioned leg permitting the lip to spring into engagement with the nut.

In testimony whereof I affix my signature in presence of two witnesses.

CHARLES M. SIEVER.

Witnesses:
H. F. CEVELY,
ISAAC W. JONES.